United States Patent
Heyl

(10) Patent No.: US 7,216,503 B2
(45) Date of Patent: May 15, 2007

(54) COMBINED COOLING PLANT/HEAT PUMP CIRCUIT

(75) Inventor: Peter Heyl, Cologne (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 431 days.

(21) Appl. No.: 10/794,102

(22) Filed: Mar. 5, 2004

(65) Prior Publication Data

US 2004/0221607 A1  Nov. 11, 2004

(30) Foreign Application Priority Data

Mar. 6, 2003  (DE) .............................. 103 10 992

(51) Int. Cl.
*F25B 39/04* (2006.01)

(52) U.S. Cl. .................... 62/324.1; 62/324.6

(58) Field of Classification Search .............. 62/324.1, 62/324.6; 137/625.43
See application file for complete search history.

(56) References Cited

U.S. PATENT DOCUMENTS

| | | | |
|---|---|---|---|
| 2,460,774 A | 2/1949 | Trautman | |
| 3,490,338 A | 1/1970 | Faust et al. | |
| 3,985,154 A | 10/1976 | Hargraves | |
| 4,255,939 A | 3/1981 | Ou | |
| 4,290,453 A | 9/1981 | Bauer | |
| 4,938,032 A * | 7/1990 | Mudford | 62/160 |
| 4,966,194 A | 10/1990 | Nakatsukasa et al. | |
| 5,375,427 A | 12/1994 | Hara et al. | |
| 5,689,962 A | 11/1997 | Rafalovich | |
| 5,709,102 A | 1/1998 | Fukumoto et al. | |
| 5,819,551 A * | 10/1998 | Fukumoto et al. | 62/324.1 |

* cited by examiner

*Primary Examiner*—Melvin Jones
(74) *Attorney, Agent, or Firm*—Brinks Hofer Gilson & Lione

(57) ABSTRACT

The invention relates to a combined plant/heat pump circuit with a compressor, a multi-way valve arranged downstream, an external heat exchanger as well as an interior heat exchanger and an internal heat exchanger. A multi-way valve is integrated into the refrigerant circuit such that a line loop is created in which one after the other the internal heat exchanger and an expansion element passable in one direction are arranged and such that the internal heat exchanger is always at the high pressure level and the internal heat exchanger is always at the low pressure level of the refrigerant circuit thereby avoiding the condensation of the refrigerant in the internal heat exchanger in heat pump operation.

9 Claims, 8 Drawing Sheets

COMBINED COOLING PLANT/HEAT PUMP CIRCUIT

BACKGROUND OF THE INVENTION

1. Field of the Invention

The invention relates to a combined plant/heat pump circuit.

2. Related Technology

It is known in the state-of-the-art to employ refrigerant circuits for the combined use as a cooling plant and heat pump. Also for the use in motor vehicles such combined systems have gained in importance. This is due to the fact that modern engine designs for motor vehicles produce less and less waste heat, which up to now has been used to heat the passenger compartment. This results in not enough heat being available to provide sufficient heat for the passenger compartment. Therefore, a cooling unit already provided as air conditioning unit is, after modification, used as heat pump in order to exploit the air of the environment or the refrigerant circuit of the vehicle as heat source to heat the passenger compartment.

A combined system of a cooling plant and heat pump ensues from U.S. Pat. No. 5,375,424. For such a system, additional heat exchangers are needed which are integrated into the refrigerant circuit by means of a combination of multi-way valves.

A combined heat pump-cooling plant system for motor vehicles also ensues from U.S. Pat. No. 5,709,102. Here, a single external heat exchanger is combined with two series-connected interior heat exchangers and a switching valve.

Also, in U.S. Pat. No. 5,689,962 a combined system of heat pump and cooling plants is disclosed, but not for motor vehicle applications.

The systems know in the stat-of-the-art are characterized in that, when interior heat exchangers are used, there is the danger of condensation of the refrigerant in the interior heat exchanger during heat pump operation.

BRIEF SUMMARY OF THE INVENTION

It is the object of this invention to avoid the condensation of the refrigerant in the internal heat exchanger on the low-pressure side.

According to the invention, the problem is solved by a combined cooling plant-heat pump circuit with a compressor, a multi-way valve arranged downstream, an external heat exchanger, as well as an interior heat exchanger and an internal heat exchanger. The system is configured such that a multi-way valve is integrated into the refrigerant circuit so that a line loop is created in which the internal heat exchanger and an expansion element are arranged one after the other. The arrangement is such that in cooling plant mode and in heat pump mode refrigerant always passes the internal heat exchanger before passing the expansion element. Accordingly, one side of the internal heat exchanger is always at the high-pressure level and the other side of the internal heat exchanger is always at the low-pressure level.

According to the concept of the invention, the internal heat exchanger for heat pump operation is moved onto the high-pressure side. That, advantageously, avoids the danger of condensation in the internal heat exchanger on the side before the compressor, which further ensures that the refrigerant circuit for the compressor is operated reliably.

BRIEF DESCRIPTION OF THE DRAWINGS

Other details, features and advantages of the invention ensue from the following description of examples of embodiment with reference to the accompanying drawings. The figures show.

DETAILED DESCRIPTION OF THE INVENTION

Figure 1:
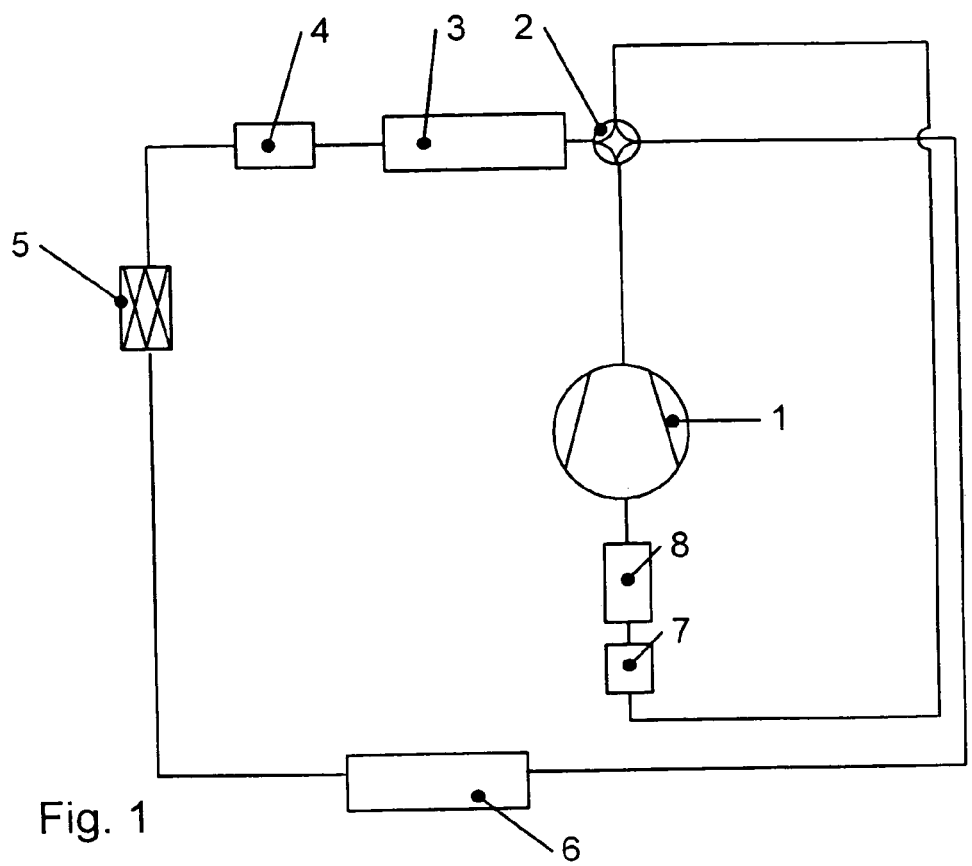
FIG. 1—combined cooling plant/heat pump circuit with expansion valve passable in both directions.

In FIG. 1 a traditional cooling plant/heat pump circuit with its essential components is shown as a process diagram. In cooling plant operation, the refrigerant is compressed in the compressor 1, flows through the multi-way valve 2 and into the external heat exchanger 3, which in cooling plant operation functions as condensator or gas cooler, and over the high-pressure side of the internal heat exchanger 4 to the expansion element 5 passable in both directions. The expanded refrigerant evaporates in the interior heat exchanger 6 taking up heat and cooling the air for the passenger compartment and eventually flows over the multi-way valve 2 to the accumulator 7 and over the low-pressure side of the internal heat exchanger 8 to the compressor 1. In heat pump operation the refrigerant compressed in the compressor 1 is directed through the multi-way valve 2 to the interior heat exchanger 6, where heat is transferred from the refrigerant to the air for the passenger compartment. Thereafter, the cooled refrigerant passes the expansion element 5 and flows at a low pressure into the internal heat exchanger 4, which in heat pump operation is at the low-pressure level of the refrigerant. The refrigerant then flows into the external heat exchanger 3, where it is evaporated taking up heat, and the refrigerant vapor passed to the accumulator 7 and into the internal heat exchanger 8, which is at the low-pressure level too.

Hereby there is the danger of condensation of the refrigerant because the internal heat exchanger 4 is already at the low-pressure side of the refrigerant circuit, and therefore has a low temperature, so that a desired overheating of the refrigerant vapor in the internal heat exchanger 8 cannot be reliably ensured, but to the contrary heat may even be dissipated, which under favorable conditions leads to condensation of the refrigerant. This danger exists under certain operational conditions and leads to an inacceptable danger for the compressor 1, which might be destroyed by fluid shocks. In addition, a pressure loss is generated by the internal heat exchanger not functioning.

Figure 2:
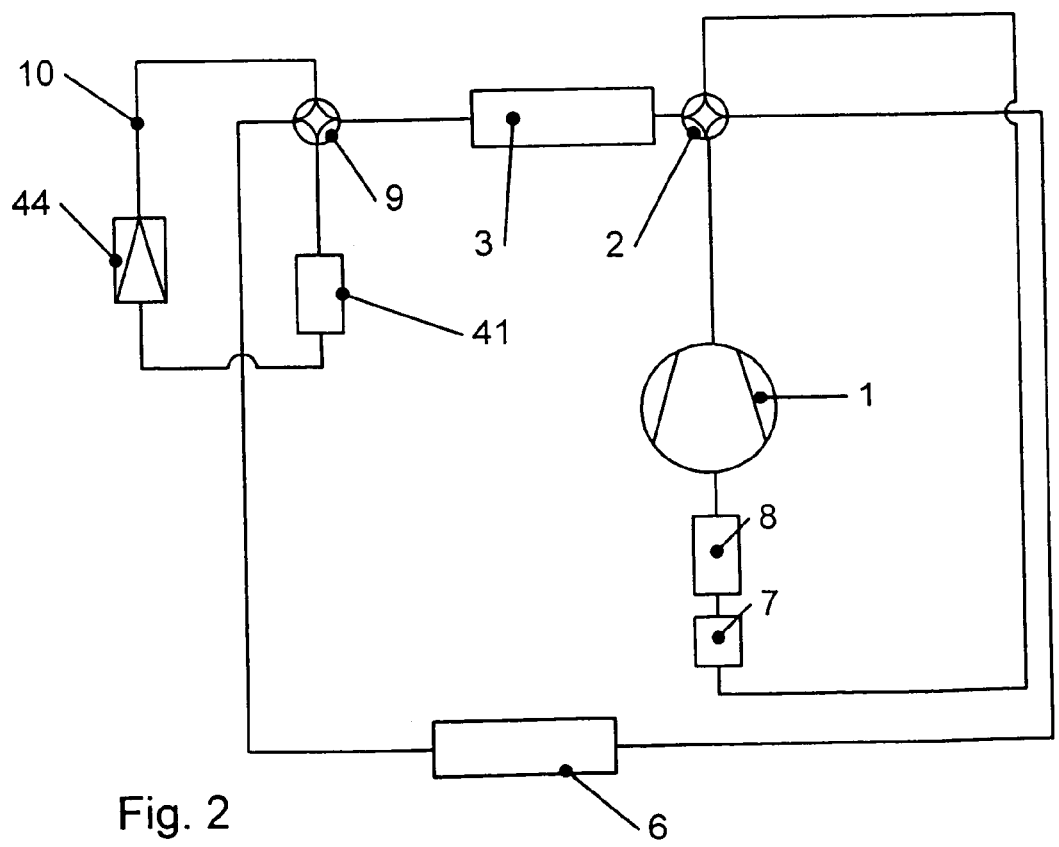
FIG. 2—combined cooling plant/heat pump circuit with expansion valve passable in one direction and line loop.

In FIG. 2 a cooling plant/heat pump circuit with a line loop 10 according to the invention is shown. The line loop 10 of the invention ensures that one side of the internal heat exchanger is always at the high-pressure side. In cooling plant operation, as it is known, the refrigerant is compressed in the compressor 1 and directed through the multi-way valve 2 into the external heat exchanger 3 for condensation, or heat dissipation. Then, the refrigerant flows through the multi-way valve 9, designed as 4/2-multi-way valve, to the internal heat exchanger 41 and dissipates heat to the low-pressure side of the internal heat exchanger 8. The refrigerant expands in the expansion element 44, which can only be passed in one direction, and again flows through the multi-way valve 9 into the interior heat exchanger 6.

The line loop 10 develops its capabilities according to the invention in heat pump mode. In this mode, the compressed refrigerant downstream of the compressor 1 is directed, multi-way valve 2, via the interior heat exchanger 6 and multi-way valve 9, to the internal heat exchanger 41. Only then is the refrigerant expended in the expansion element 44 and flows via the multi-way valve 9 into the external heat exchanger 3 and, subsequently, as usual, via the accumulator 7 to the internal heat exchanger 8. The line loop 10 and the multi-way valve 9 make it possible to move the internal heat exchanger 41 onto the high-pressure side of the refrigerant circuit ensuring the heat transfer from the internal heat exchanger 41 to the internal heat exchanger 8 by a sufficiently great difference in temperature of the refrigerant flows in the heat exchangers. Thus, condensation of the refrigerant in the internal heat exchanger 8 can be reliably excluded. Furthermore it is advantageous that a more cost-effective expansion element 44 passable in one direction only can be used.

Figure 3:
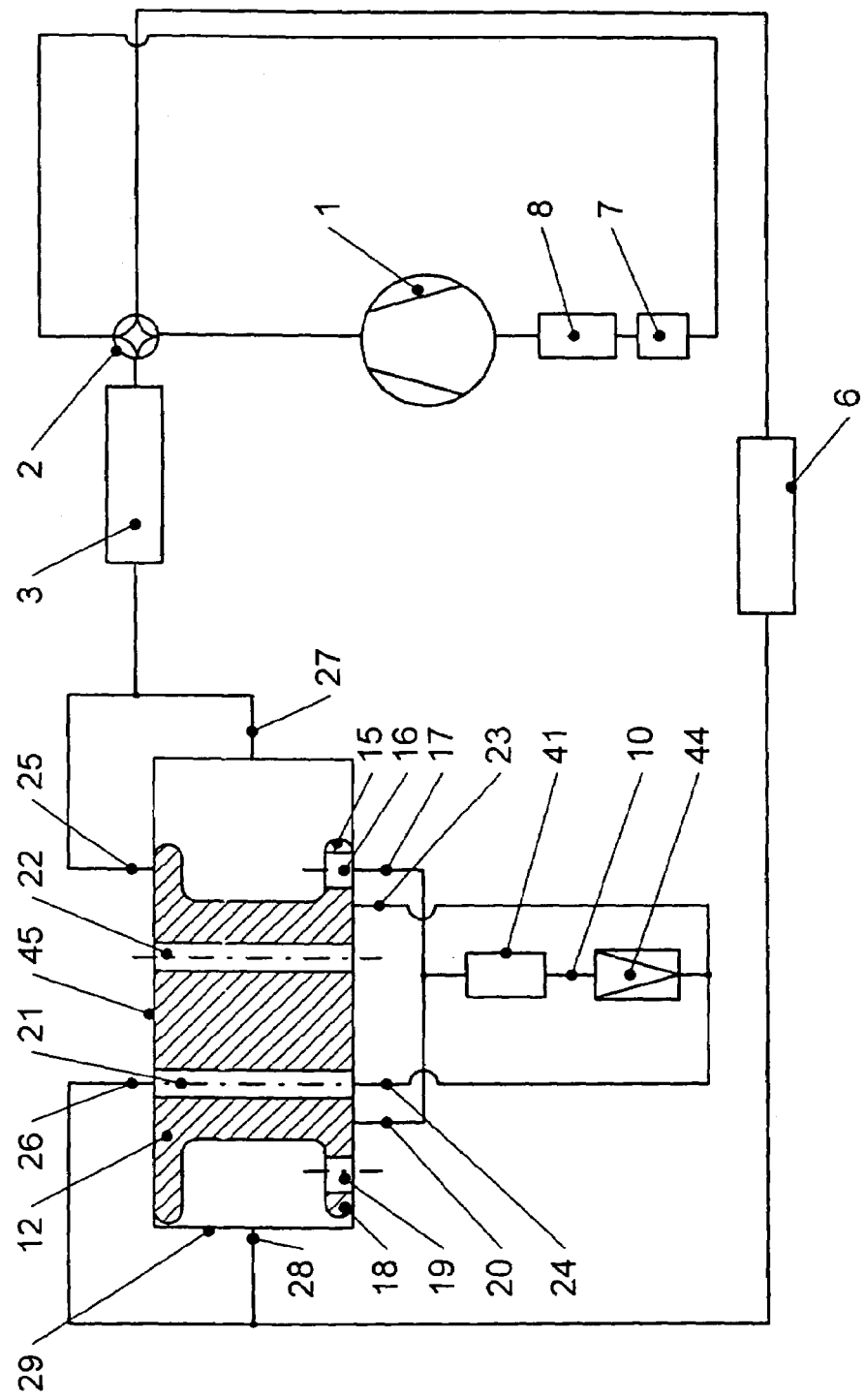
FIG. 3—combined cooling plant/heat pump circuit with automatically switching multi-way valve in cooling plant operation.

A realization of one embodiment of the multi-way valve 9 is shown in FIG. 3. This particular multi-way valve 45, designated as valve is an advantageous embodiment of the multi-way valve 9 making possible the line loop 10. The multi-way valve 9 is designed to switch automatically based on the pressure difference between the high pressure and the low pressure of the refrigerant circuit and has a valve element 12 a cooling plant position or a heat pump position, respectively, in a valve body 29 depending on the switching of the refrigerant circuit. Different flow paths of the refrigerant in the circuit are created based on the position of the valve element 12 in the valve body 29.

Particularly advantageous is the design of the valve element 12 with limitation lips 15 and 18 and passages 16 and 19 provided therein, as shown in FIG. 3. The valve element 12, further, has refrigerant channels 21, 22. Provided in the valve body 29 are several connections 17, 20, 23, 24, 25, 26, 27, 28 for refrigerant lines which allow the integration and function and switching from cooling plant mode and position to heat pump mode and position.

The operation of the refrigerant circuit according to the invention is described in the following. In cooling plant operation the refrigerant is compressed in the compressor1, passes the multi-way valve 2 and flows into the external heat exchanger 3. High pressure is applied to the valve body 29 at connection 27 via the connection of the condensate gas cooler, or the external heat exchanger 3, respectively, in cooling plant operation. This moves the valve element 12 in the valve body 29 into the cooling plant position (to the left as seen in FIG. 3. The refrigerant flowing at high pressure into the valve body flows through the passage 16 in limitation lip 15 of the valve element 12 to connect the expansion element in cooling plant operation to connection 17 of the internal heat exchanger 41.

The refrigerant flows through the connection 17 to the internal heat exchanger 41, is then expanded in the expansion element 44 and flows via the connection 24 back to the multi-way valve 45. In the cooling plant position of the valve element 12, the channel 21 is arranged or switched so that the refrigerant flows therethrough to connection 26 and then to the interior heat exchanger 6, and subsequently through the multi-way valve 2 to the accumulator 7 and the internal heat exchanger 8 and back to the compressor 1.

As seen from the above, in cooling plant position of the multi-way valve 45, low pressure is applied to the connection 28 (downstream of the expansion element 44) and high pressure to the connection 27. The pressure difference causes the valve element 12 to take the cooling plant position. In cooling plant position the connections 20, 23 and 25 at the valve element are blocked.

Figure 4:
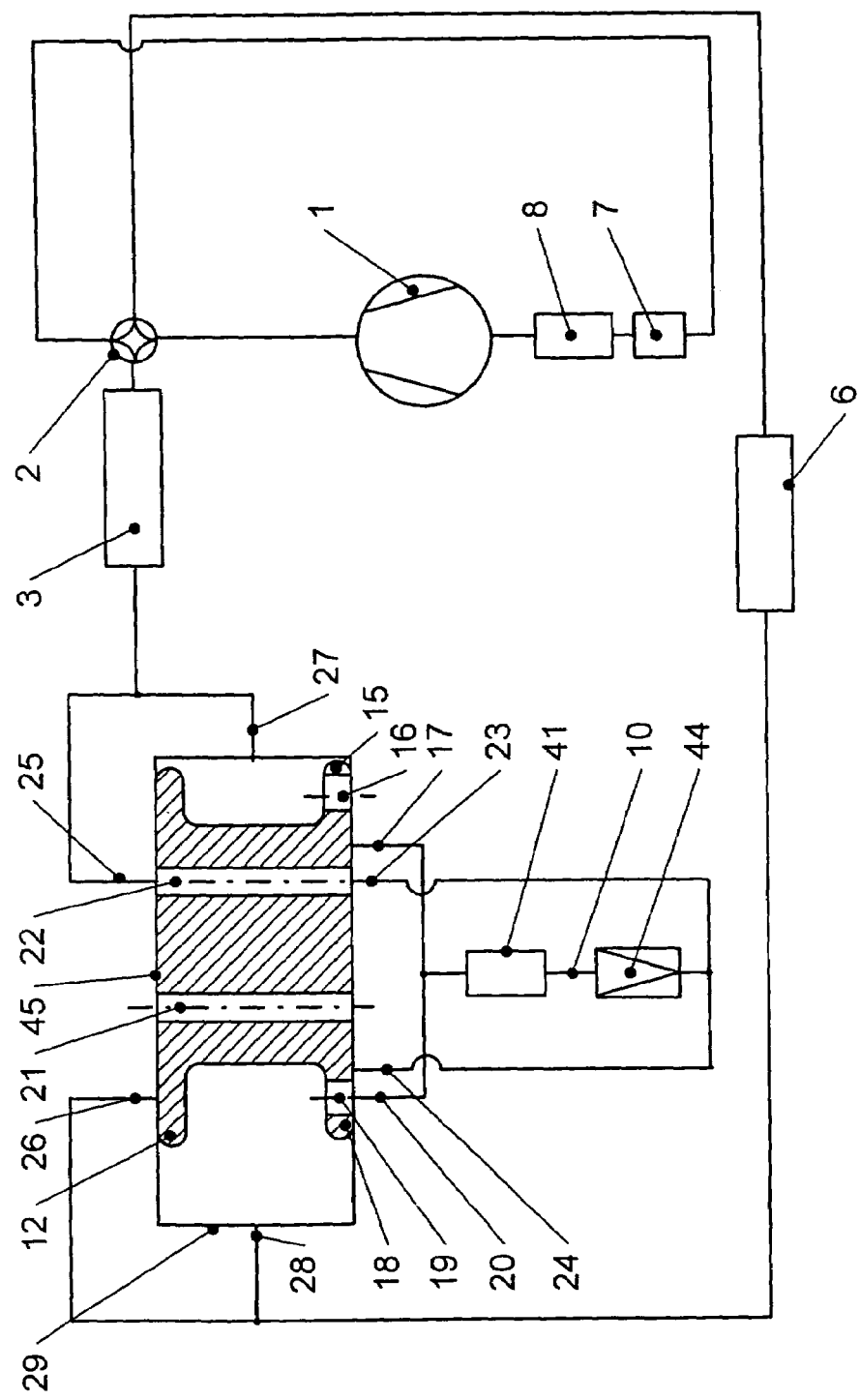
FIG. 4—combined cooling plant/heat pump circuit with automatically switching multi-way valve in heat pump position.

In FIG. 4 the same circuit is shown for the heat pump position of the valve element 12 (moved to the right side of the Figure) of the multi-way valve 45. In heat pump operation, first, the refrigerant is compressed in the compressor 1 and directed by multi-way valve 2 so as to flow through the interior heat exchanger 6 to the connection 28 of the multi-way valve 45. The high pressure causes the valve element 12 in the valve body 29 to take the heat pump position. The refrigerant flows via the connection 28 into the interior of the multi-way valve 45 and through the passage 19 into the connection 20. The connection 20 directs the refrigerant to the internal heat exchanger 41 and then to the expansion element 44.

After expansion, the low pressure refrigerant flows via the connection 23 and the channel 22 to the connection 25 and eventually to the external heat exchanger 3 and then the multi-way valve 2. From the multi-way valve 2 and after the refrigerant has passed the accumulator 7 and the internal heat exchanger 8, the circuit doses at the compressor 1. In heat pump position the connections 24 and 17 at the multi-way valve 45 are blocked by the valve element 12. The connection 26 is blocked too.

A particular advantage of this embodiment of the invention is the valve element 12 takes its switching position automatically.

Figure 5:
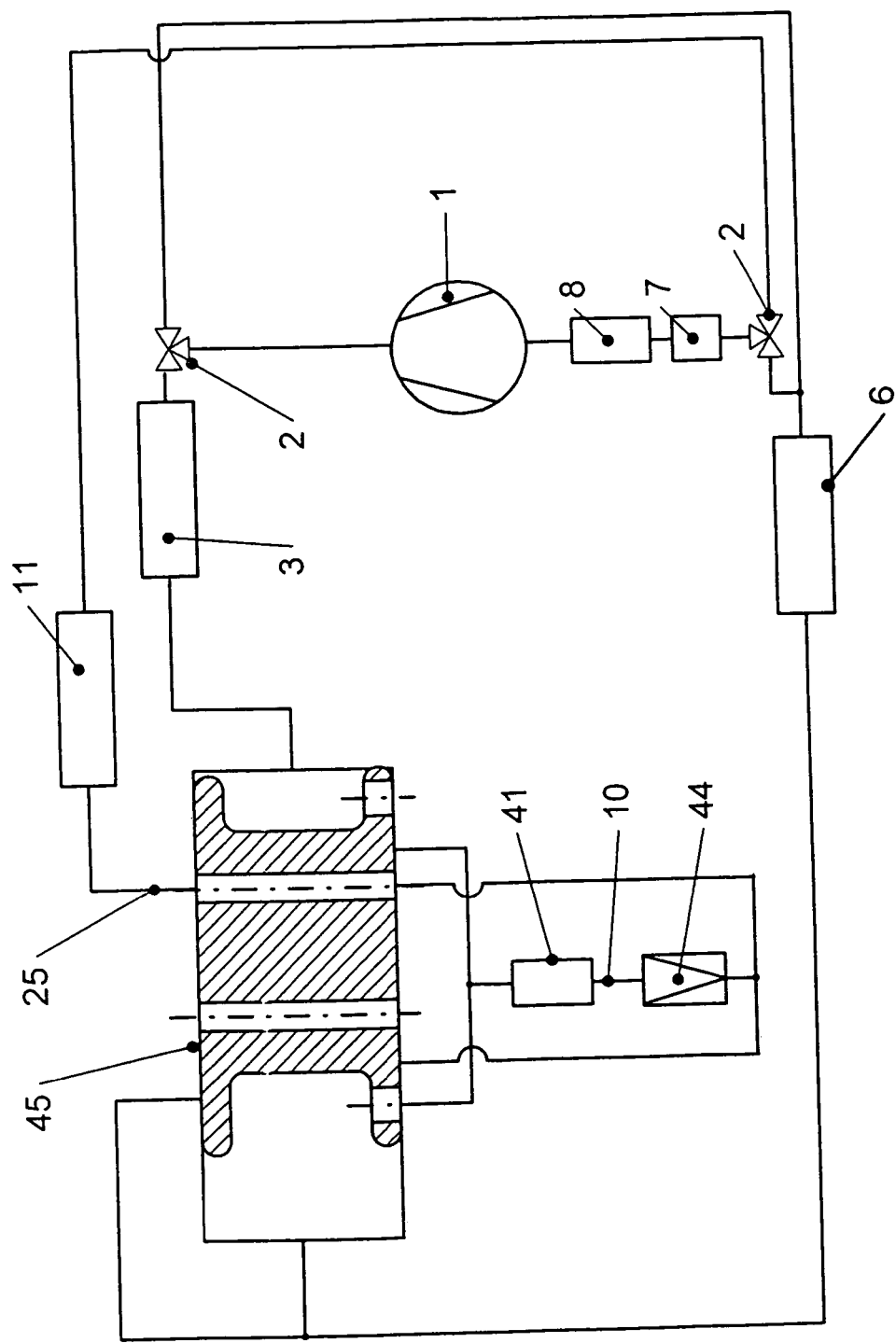
FIG. 5—combined cooling plant/heat pump circuit with additional utilization of the glycol circuit as heat source in heat pump position.

FIG. 5 shows a particularly advantageous embodiment of the invention of FIG. 4 in a further embodiment, whereby in heat pump position the connection 25 of the multi-way valve 45 is connected to the coolant/refrigerant heat exchanger 11. In this way the coolant/refrigerant heat exchanger, particularly advantageously the heat exchanger in a glycol circuit of a motor vehicle, is used as evaporator for the refrigerant circuit. To realize this circuit, instead of the multi-way valve 2 in FIG. 4, now in FIG. 5 a three-way valve 2 is to be used in combination with another three-way valve 2. Otherwise, the circuit operates substantially as previously described. As an alternative to the coolant/refrigerant heat exchanger 11, waste-heat heat exchanger can be used in alternative drive systems such as waste-heat heat exchangers with fuel cells or in battery-powered vehicles. A heat exchanger 11 can also be designed to function as an exhaust gas heat exchanger.

Figure 6:
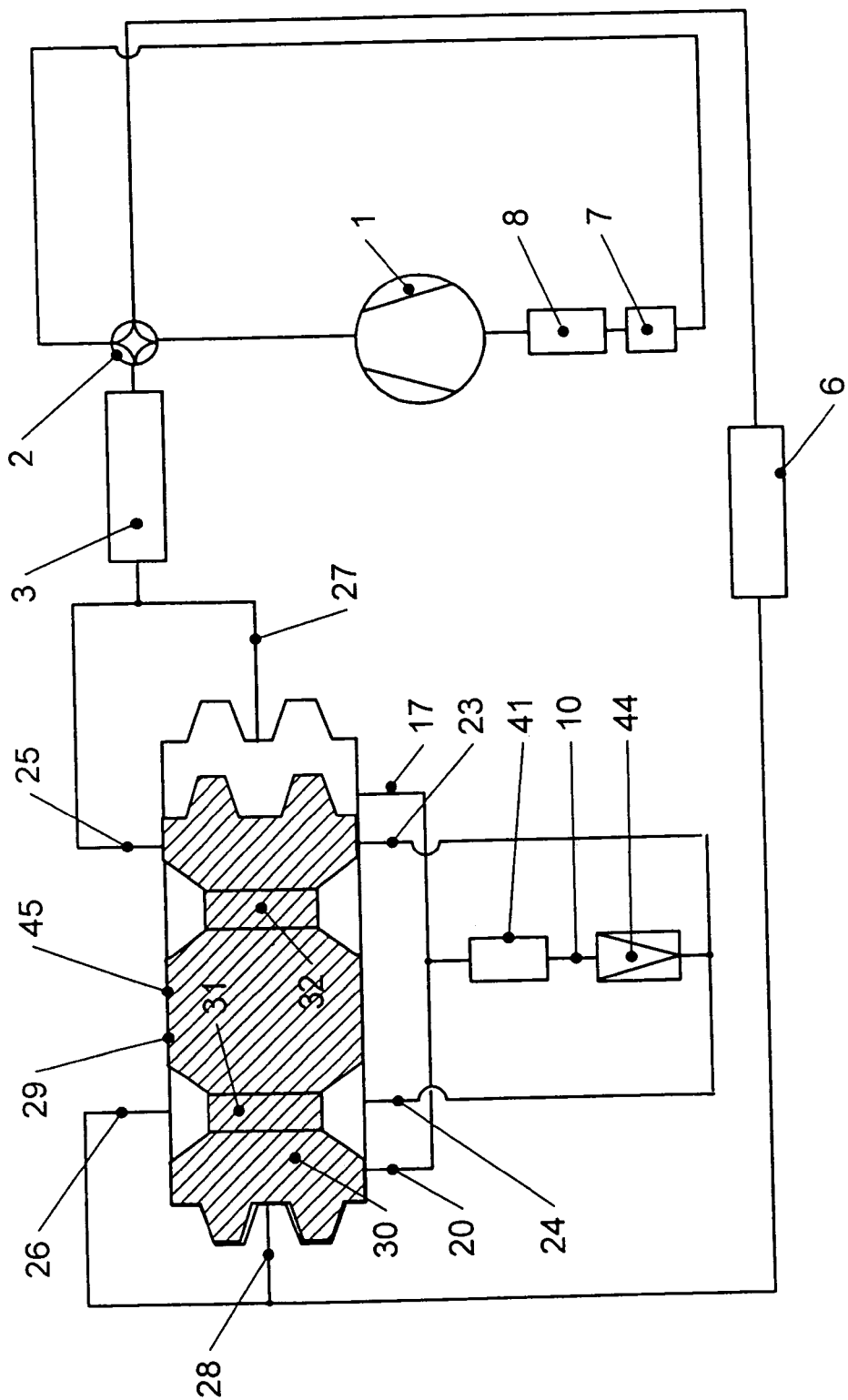
FIG. 6—combined cooling plant/heat pump circuit with cylindrical multi-way valve in cooling plant position.

FIG. 6 represents a further embodiment of the invention (similar to FIG. 3) with multi-way valve 45 designed as cylindrical to automatically take the switching position due to the pressure difference. A valve element 30 provided with taperings 31 and 32 is arranged in the valve body 29 of the multi-way valve 45. The taperings 31 and 32 lead to refrigerant chambers created in the valve body 29. The connections 25, 26, 20, 24, 23 and 17 are arranged at the valve body 29 to correspond with the various sealing surfaces of the valve element 30. This embodiment of the invention enables a valve element 30 rotationally symmetrical about its longitudinal axis, to be used, which can be manufactured technologically easier compared to the valve element 12 of the multi-way valve 45.

Figure 7:
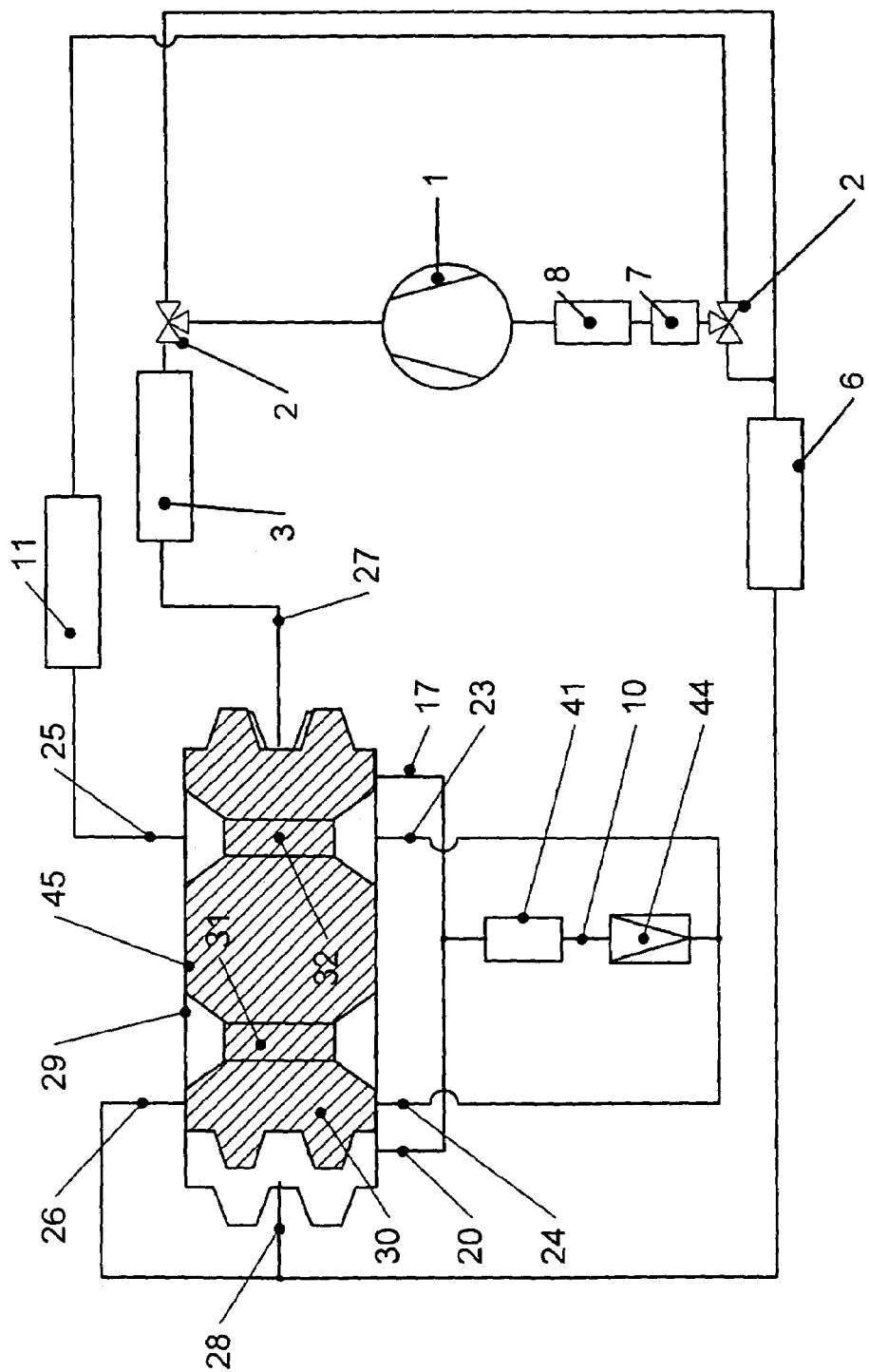
FIG. 7—cooling plant/heat pump circuit with cylindrical multi-way valve and utilization of glycol as heat source.

The function of the multi-way valve 45 of the invention of FIGS. 6 and 7 is similar to the function of the multi-way valve 45 described in the FIGS. 4 and 5. Also, by analogy with FIG. 5, FIG. 7 shows the refrigerant circuit of the invention including a coolant/refrigerant heat exchanger 11, which in heat pump operation of the circuit is used as evaporator for the refrigerant.

Figure 8:
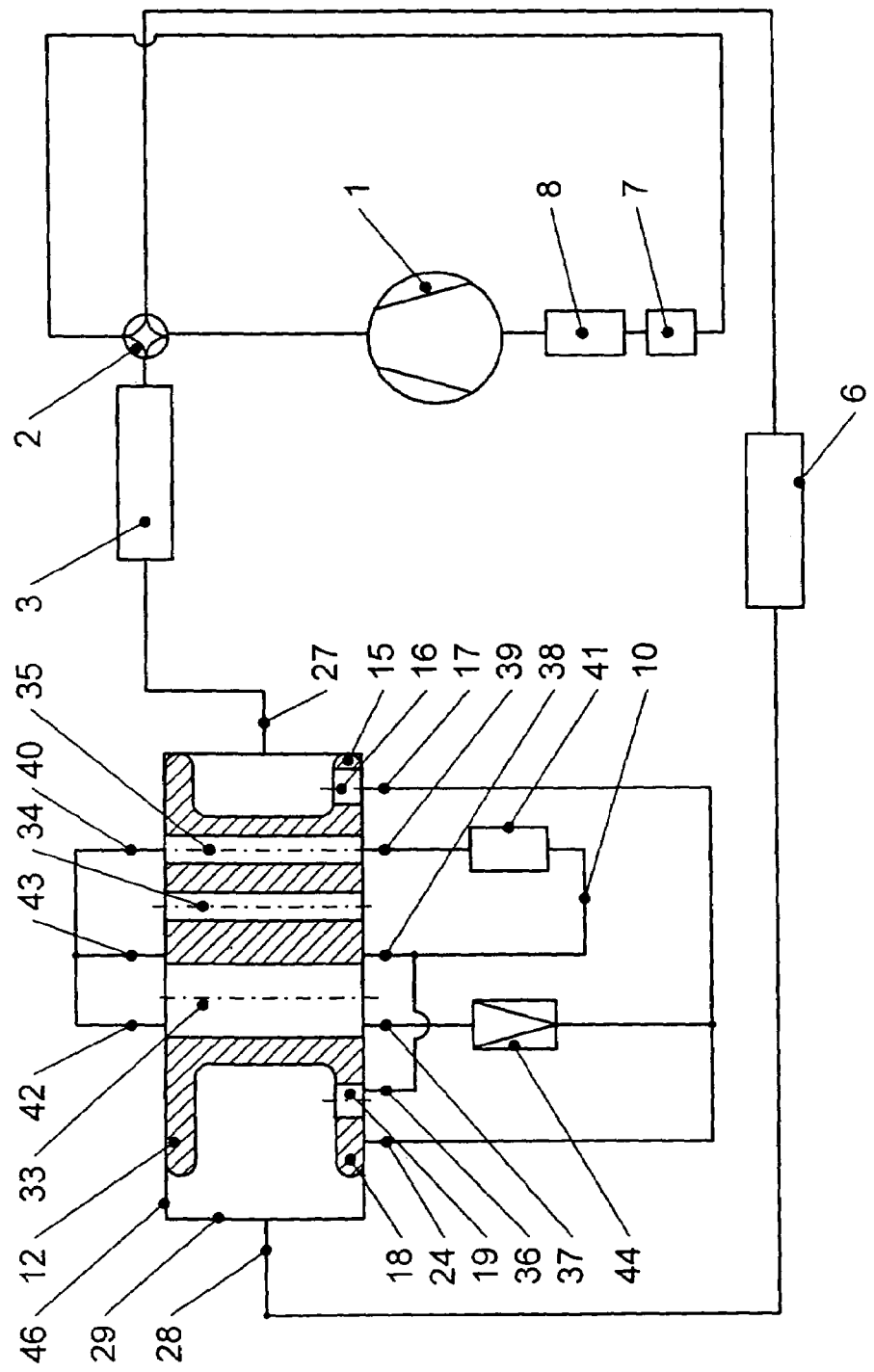
FIG. 8—combined cooling plant/heat pump circuit with changing passage of the high-pressure side of the internal heat exchanger in heat pump position.

Referring now to FIG. 8, a device according to the invention is shown that has a multi-way valve 46. The multi-way valve 46 consists of a valve body 29 and valve element 12 arranged slidingly therein. The valve element 12 has channels 33, 34 and 35. According to the invention, connections 36, 37, 38, 39 and 17 as well as 24 are provided at the valve body 29.

In heat pump operation, the refrigerant is compressed in the compressor 1, flows via the multi-way valve 2 to the interior heat exchanger 6. From there, via the connection 28 at high pressure the refrigerant flows into the multi-way valve 46. Hereby the valve element 12 takes the heat pump position and releases the passage 19 to the connection 36. Via this connection the refrigerant flows to the internal heat exchanger 41 and via the connection 39 through the channel 35 to the connection 40. The connection 40 is connected to the connection 42, and through the channel 33 the connection 42 is connected to the connection 37 leading to the expansion element 44. After expansion the refrigerant flows to the connection 17 and through the passage 16 to the connection 27 and eventually to the external heat exchanger 3. Then the refrigerant is directed, via the multi-way valve 2, to the accumulator 7 and the internal heat exchanger 8 to the compressor 1—the circuit is closed.

Figure 9:
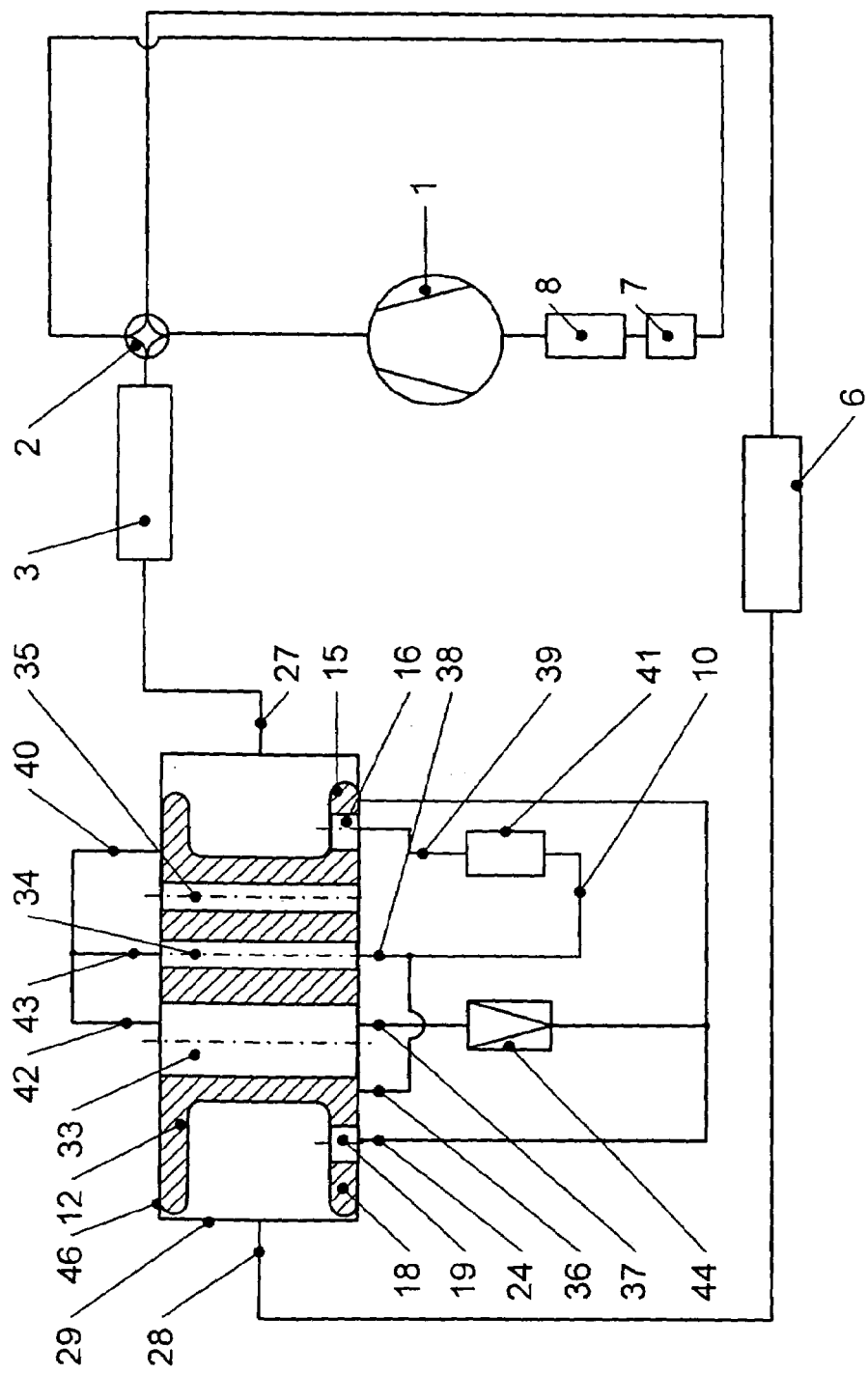
FIG. 9—combined cooling plant/heat pump circuit with changing passage of the high-pressure side of the internal heat exchanger in cooling plant position.

FIG. 9 shows the refrigerant circuit of the invention in cooling plant position which initiates with the multi-way valve 2 directing the refrigerant from the compressor 1 to the external heat exchanger at high pressure.

In the multi-way valve 46 of the invention shown in the FIGS. 8 and 9 the flow direction in the internal heat exchanger 41 is changed depending upon the operational mode, cooling plant operational mode or heat pump operational mode. This results in the peculiarity of the internal heat exchanger that the co-current principle of the refrigerant flow in the internal heat exchanger 41 and 8 is realized in one operational mode and the countercurrent principle in the other operational mode.

Generally, the realization of the refrigerant circuits according to the invention advantageously allow to refrain from using expensive expansion valves passable in two directions for cooling plant/heat pump combinations.

The invention claimed is:

1. A combined cooling plant/heat pump refrigerant circuit comprising a compressor, a first multi-way valve arranged downstream of the compressor, an external heat exchanger, an interior heat exchanger and an internal heat exchanger, a second multi-way valve is integrated into the refrigerant circuit so that a line loop is created in which the internal heat exchanger is arranged upstream of an expansion element passable in one direction, and the internal heat exchanger always being arranged to be at the high pressure level of the refrigerant circuit and the interior heat exchanger always being arranged to be at the low pressure level.

2. The cooling plant/heat pump circuit of claim 1 wherein the multi-way valve switches automatically based on the pressure difference between the high pressure and the low pressure of the refrigerant and in the circuit a valve element in a valve body of the multi-way valve takes a cooling plant position or a heat pump position, by which flow paths of the refrigerant in the refrigerant circuit are switched.

3. The cooling plant/heat pump circuit of claim 2 wherein the valve element of the multi-way valve includes limitation lips having passages arranged therein for the refrigerant and the refrigerant channels, the valve body having multiple connections for refrigerant lines to integrate the multi-way valve into the refrigerant circuit.

4. The cooling plant/heat pump circuit of claim 1 wherein the multi-way valve includes a cylindrical valve element having taperings by which refrigerant flow chambers are formed in a valve body.

5. The cooling plant/heat pump circuit of claim 1 wherein a heat exchanger as heat source in heat pump operation is integrated into the refrigerant circuit and for that the heat exchanger is connected via a connection to the multi-way valve.

6. The cooling plant/heat pump circuit of claim 5 wherein the heat exchanger is designed to function as refrigerant heat exchanger or air heat exchanger.

7. The cooling plant/heat pump circuit of claim 1 wherein in the cooling plant mode and in heat pump mode the line loop is passed by the refrigerant in equal directions.

8. The cooling plant/heat pump circuit of claim 1 wherein in cooling plant mode and in heat pump mode the internal heat exchanger is passed in different directions and for that a valve element has channels defined therein and a valve body has connections coupled to the internal heat exchanger.

9. A combined cooling plant/heat pump refrigerant circuit comprising:
a compressor;
a first multi-way valve located downstream of the compressor;
a second multi-way valve having first and second connections coupled to receive refrigerant from said first multi-way valve, said second multi-way valve including a valve element and a valve body, said valve element being moveable between a cooling plant position and a heat pump position depending on whether high pressure refrigerant is provided to said second multi-way valve via either the first or second connection;
an internal heat exchanger coupled to always receive high pressure refrigerant from the second multi-way valve;
an expansion element being passable in one direction and located downstream of the internal heat exchanger;
an interior heat exchanger located downstream of the expansion element and being coupled to always receive low pressure refrigerant;
an output of the expansion element also being coupled to the second multi-way valve and the second multi-way valve having passageways and connections to couple the expansion valve to the interior heat exchanger by alternate flow paths.

* * * * *